FIG.2.

United States Patent Office 3,505,016
Patented Apr. 7, 1970

3,505,016
ISOTOPIC EXCHANGE PROCESSES
Peter Thomas Walker, Reading, England, and Keith Roderick Poole, Johannesburg, Transvaal, Republic of South Africa, assignors to United Kingdom Atomic Energy Authority, London, England
Filed Jan. 4, 1967, Ser. No. 607,306
Claims priority, application Great Britain, Jan. 7, 1966, 880/66
Int. Cl. C01h 4/00; B01h 1/08; B01j 9/00
U.S. Cl. 23—210                  5 Claims

ABSTRACT OF THE DISCLOSURE

The invention discloses a process and apparatus for producing deuterium enrichment of the ammonia-hydrogen type, wherein the raw material, e.g. ammonia synthesis gas, contacts the ammonia in a cold transfer tower. A cold reflux tower is also provided in addition to the usual hot and cold main tower. The arrangement results in a very substantial reduction in the total volume of the plant with consequential cost savings.

BACKGROUND OF THE INVENTION

The present invention relates to the production of materials which have a deuterium content in excess of the natural deuterium content and is particularly concerned with the dual temperature ammonia-hydrogen process for the production of deuterium enriched materials.

The product of most deuterium enrichment processes is heavy water or deuterium oxide. As is well known, heavy water acts as a moderator and slows down fast neutrons produced by nuclear fission. Many reactor systems have been proposed using heavy water either as a moderator only or as a moderator and coolant.

Several methods of deuterium enrichment have been proposed and each of these has been studied extensively in an endeavor to produce heavy water at an economic price. One such process is the dual-temperature ammonia-hydrogen process. This process involves passing liquid ammonia under high pressure in turn through a cold and a hot tower in counter-current to a stream of gaseous hydrogen passing from the hot tower to the cold tower.

The temperature of the cold tower may be —70° C. and that of the hot tower 20° C. and the whole process is effected at a high pressure, e.g. 240 atmospheres. The ammonia very desirably contains a catalyst to increase the rate of reaction, the catalyst presently preferred being potassium amide ($KNH_2$). An appreciable improvement of catalyst performance may be obtained by the addition of primary or secondary amines to the ammonia as described in British Patent No. 896,269.

Within both towers, isotopic exchange occurs between the liquid and gaseous streams. In the hot tower the conditions favour the passage of deuterium from the ammonia to the hydrogen stream which is then passed from the hot to the cold tower enriched in deuterium. In the cold tower conditions are such that the passage of deuterium from the hydrogen to the ammonia occurs and an enriched ammonia stream is thus passed from the cold to the hot tower. Thus, both streams between the towers are enriched in deuterium and an enriched product may be withdrawn from either stream between the two towers.

Either of the two streams, having been passed through both towers may be recycled to the first tower through which they were passed, for example, the hydrogen stream would be recycled by returning the gas stream from the cold tower to the hot tower. With such a recycle the stream forms a closed circuit, the recycle section of which contains a material depleted in deuterium.

Since a product having an increased deuterium content is withdrawn from the system, it is necessary to continually restore the deuterium content of the system. If both streams form a closed circuit, then the recycle portion of such closed circuit may, for example, be passed into contact with a stream of water of natural deuterium content to replenish the stream. Alternatively, only one of the streams may form a closed circuit, at least part of the recycle portion of the other stream being continually withdrawn as waste and replenished by a stream having a natural or nearly natural deuterium content. Thus, the ammonia stream may form a closed system whilst part of the hydrogen stream is continualy withdrawn as waste and replenished with hydrogen of natural or nearly natural deuterium content.

It is the object of the present invention to provide a new or improved variation on the dual temperature ammonia hydrogen process as hereinbefore described.

SUMMARY OF THE INVENTION

According to the present invention there is provided a process for the production of deuterium enriched materials which comprises a dual-temperature ammonia-hydrogen exchange process in which the depleted stream of ammonia from the hot tower is split into two sub-streams, the first of these sub-streams having its deuterium content replenished by being passed in counter-current flow in a cold transfer tower with a hydrogen-containing gas, the second of these sub-streams being passed in counter-current flow in a cold reflux tower with the stream of pure hydrogen leaving the main cold tower, the said tow sub-streams being combined and being passed to the main cold tower.

In practice, it may be difficult to find supplies of pure hydrogen in sufficient quantities to perform the replenishing function. Therefore, since in the ammonia industry, large quantities of hydrogen/nitrogen mixture (in a 3:1 molecular ratio) are available it is preferred to use this ammonia synthesis gas as the said hydrogen-containing gas. However the presence of the nitrogen raises the total gas flow required to supply a given quantity of deuterium by 33%. Moreover the relatively high density of the nitrogen markedly lowers the gas superficial velocity that can be used without flooding, and these two factors together raise the cross-sectional area of the tower to nearly three times that necessary using a pure hydrogen feed. However, since the ammonia synthesis gas only flows in the transfer tower, this is the only tower which is so affected.

It may also be desirable to pass at least a portion of the hydrogen leaving the cold reflux tower to a hot reflux tower and there contact it with at least a portion of the ammonia leaving the hot tower.

The present invention also includes apparatus for the production of deuterium enriched materials comprising a hot tower, a cold tower, a cold reflux tower and a cold transfer tower, together with conduit means for withdrawing ammonia from the base of the hot tower and passing it to the transfer and reflux towers in parallel, thence to the cold tower and back to the hot tower, and conduit means for withdrawing hydrogen from the top of the hot tower and passing it to the cold tower, thence to the reflux tower and back to the hot tower, the ammonia and hydrogen flowing in counter-current in the towers.

The usual heat exchangers are provided between the hot and cold streams.

It will be observed that both the hydrogen and ammonia flow in closed cycles and the ammonia stream preferably is tapped at a point after the main cold tower and passed to a "finishing plant" which may be of any suitable design. This ammonia is returned to the circuit after depletion of the deuterium content.

Desirably also an evaporator takes the ammonia leaving the hot tower and adds a proportion of ammonia to the hydrogen entering that tower.

BRIEF DESCRIPTION OF THE DRAWINGS

In order that the present invention may more readily be understood, one embodiment of the same will now be described with reference to the accompanying drawings wherein:

FIGURE 2 is a diagrammatic flow sheet of a prior proposal.

DESCRIPTION OF THE PREFERRED EMBODIMENT

Figure 1:
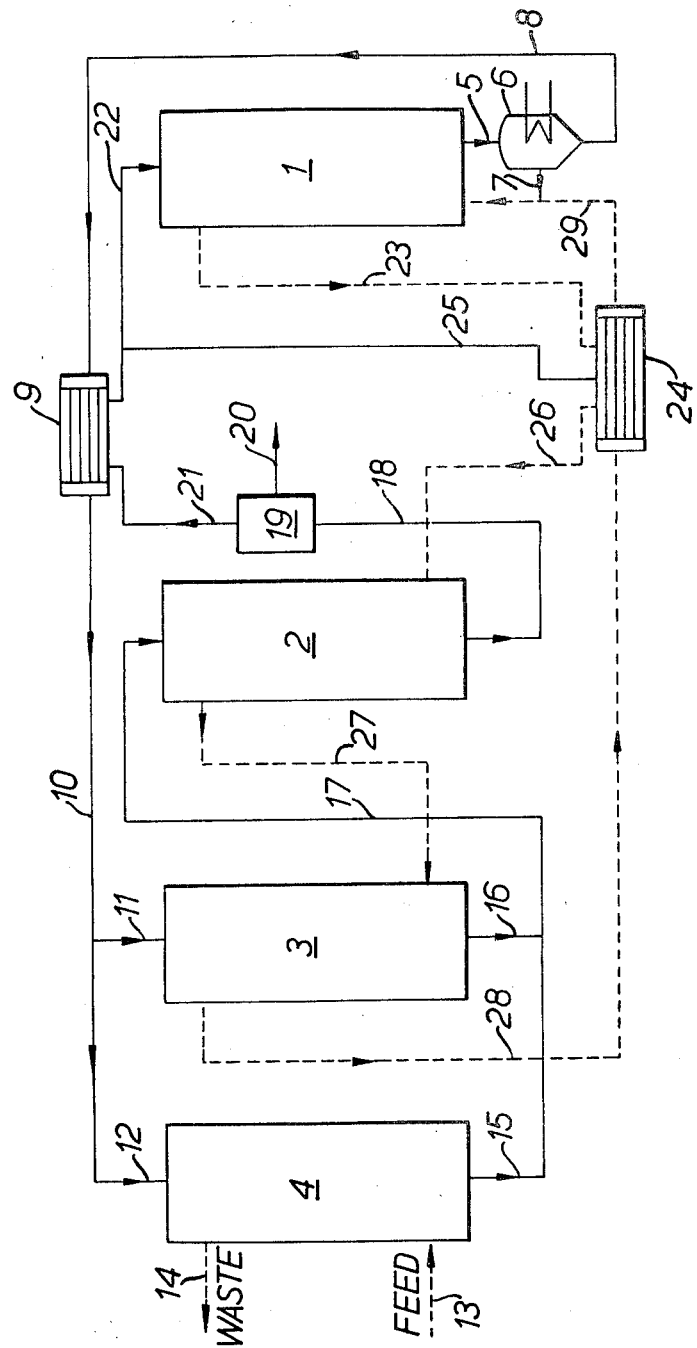
FIGURE 1 is a diagrammatic flow sheet of an embodiment of this invention.

Referring now to FIGURE 1 of the drawings, it will be seen that the apparatus comprises a hot tower 1, a cold tower 2, a cold reflux tower 3 and a cold transfer tower 4. The cold towers are maintained at a temperature of about $-70°$ C. and the hot tower at about $20°$ C. whilst the pressure within the system is about 240 atmospheres.

A stream of liquid ammonia containing a catalyst, e.g., potassamide, in a concentration of about 35 gm./litre and also containing about 16% by weight of pyrrolidine leaves the base of the hot tower 1 by a conduit 5 and passes to an evaporator 6 where it is heated and a small proportion of the ammonia vapourised and withdrawn through a conduit 7. The main body of the ammonia stream leaves the evaporator 6 through a conduit 8 and passes to a heat exchanger 9 where it is cooled to the temperature of the cold towers.

The cold ammonia leaves the heat exchanger 9 through a conduit 10 and is split into two portions in conduits 11 and 12 passing respectively into the tops of the cold reflux tower 3 and the cold transfer tower 4. In the cold transfer tower the ammonia is contacted in countercurrent by ammonia synthesis process gas (a mixture of hydrogen and nitrogen) of natural deuterium content entering by a conduit 13 and leaving by a conduit 14. The ammonia stream leaves the cold transfer tower 4 by a conduit 15 and leaves the cold reflux tower by a conduit 16 and the conduits 15 and 16 merge into a conduit 17 which passes to the top of the main cold tower 2.

The ammonia stream leaves the cold tower 2 by a conduit 18 and passes to a finishing plant 19 of suitable design. The function of this plant is to withdraw at least a portion of the enriched ammonia passed thereto, treat the same to remove the deuterium content, and return depleted ammonia to the circuit. Product deuterium leaves by a conduit 20 whilst the main stream of ammonia leaves the finishing plant by a conduit 21 and is passed to the heat exchanger 9 to cool the ammonia entering by the conduit 8.

The ammonia heated in the heat exchanger 9 is withdrawn by a conduit 22 and passed to the top of the hot tower 1.

Turning now to the hydrogen stream, this stream leaves the hot tower 1 by a conduit 23 and passes to a heat exchanger 24 where it is cooled and its ammonia content condensed. The condensed ammonia is removed by a conduit 25 and passed to the conduit 22. The cooled hydrogen leaves the heat exchanger 24 by a conduit 26 and is passed to the lower part of the main cold tower 2, up which it flows to be removed from the top thereof by a conduit 27. The conduit 27 conveys the hydrogen to the lower part of the reflux tower 3 and a conduit 28 removes the hydrogen from the top of the tower 3 and passes it to the heat exchanger 24.

Heated hydrogen leaves the heat exchanger 24 by a conduit 29 and is passed to the base of the hot tower 1. Ammonia vapour from the conduit 7 is used to saturate the hydrogen with ammonia prior to entry into the hot tower.

It might be thought that the use of four towers, as opposed to the conventional three towers, is no advance. However the major economic factor in the production of heavy water is the capital investment in the towers which is in turn based on their volume. The volume of the towers depends on gas flow (cross-sectional area) and number of practical stages (theoretical stages divided by efficiency). Hence the most economical plant is that having the lowest volume for producing an enrichment according to specification. Additionally for any given plant volume, it will be apparent that the lowest value for gas volume circulation will be preferred as this determines conduit diameters, heat exchange capacities and pumping costs.

On the basis of a product flow rate of 1 mole $D_2O$ per hour at a concentration of 99.8% pure and a feed at natural concentration, the values given in Table 1 were calculated and these correspond to a "plant volume" of 1141 units.

TABLE 1

| Quantity | Stream | Tower | | | |
| --- | --- | --- | --- | --- | --- |
| | | Hot | Cold | Reflux | Transfer |
| Flow rate (moles/hr.) | Hydrogen | 12,362 | 12,362 | 12,362 | |
| | Ammonia | 1,846 | 1,846 | 30 | 1,816 |
| | Process gas | | | | 11,461 |
| Approach to equilibrium | Enriched end | 0.889 | 0.92 | 0.467 | 0.75 |
| | Depleted end | 0.96 | 0.58 | 0.92 | 0.6 |
| Theoretical stages | | 23.79 | 5.86 | 0.54 | 2.00 |

It will be observed that the reflux tower is small, containing only 0.54 theoretical stage and taking only about 0.167% of the total ammonia flow. In practice therefore the reflux tower may form an upper stage to the cold tower with the ammonia inlet constituted by conduit 15 connected to the junction between towers 2 and 3 which will be of the same diameter as there is the same gas flow through them.

DESCRIPTION OF THE PRIOR ART

Figure 2:
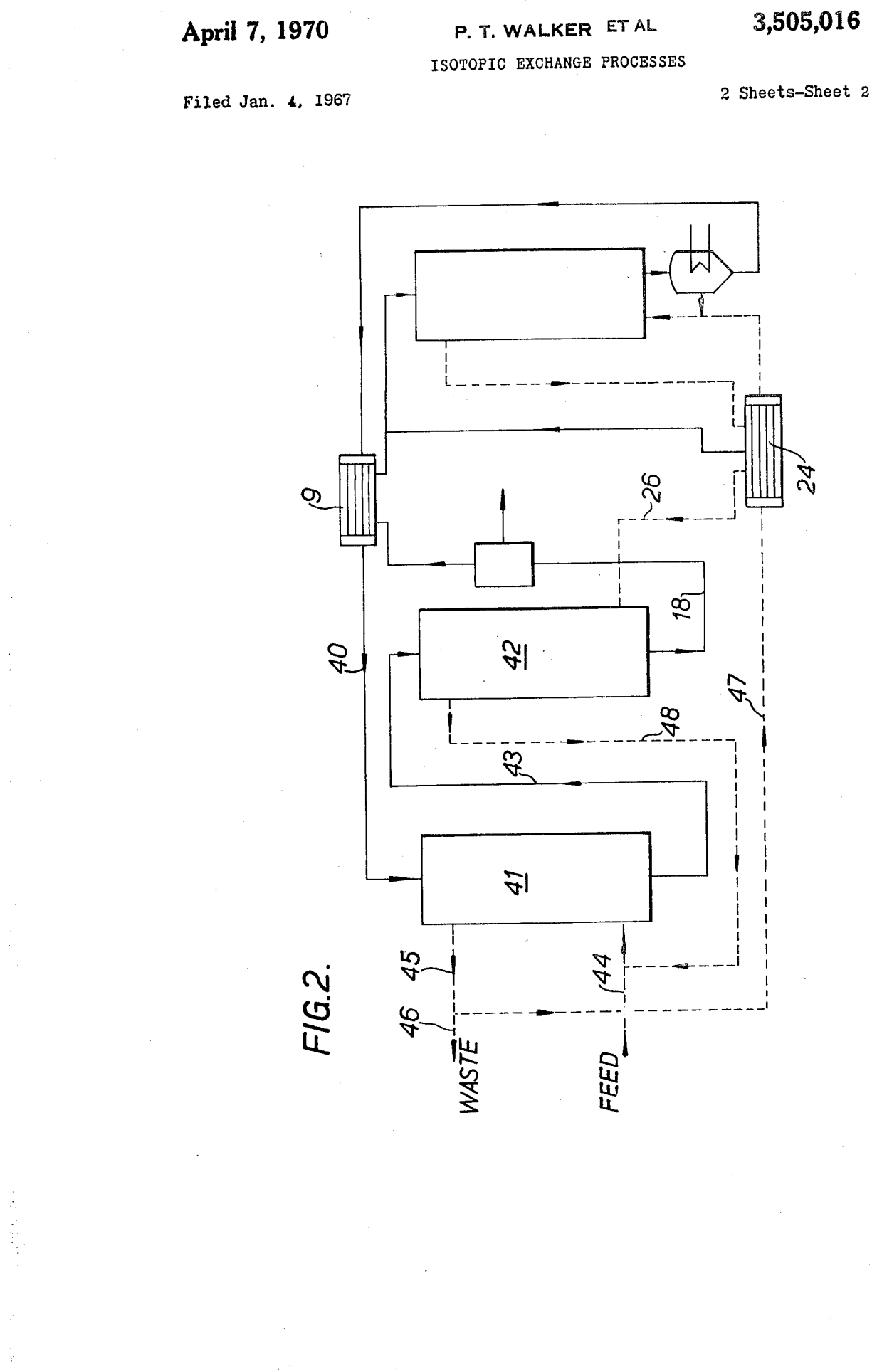

A conventional three tower system is shown in FIGURE 2 and it will be seen that the ammonia stream from the heat exchanger 9 is passed by a conduit 40 to the top of a cold feed tower 41 and from the base of this tower is passed to the top of a cold stripper tower 42 by a conduit 43. From the base of the cold stripper tower the ammonia passes by the conduit 18 as previously described.

The gas circulating in the system is ammonia process gas, not pure hydrogen, and since it circulates in all towers, these must be suitably dimensioned.

The gas is fed into the tower 41 through a conduit 44 and is withdrawn through a conduit 45, part being rejected to waste through a conduit 46 and part being passed to the heat exchanger 24 by a conduit 47. The gas leaving the heat exchanger 24 via the conduit 26 is passed to the base of the cold stripper tower 42 and is withdrawn from the top of this tower by a conduit 48 which joins the conduit 44.

Using the same parameters, the optimum design for this three tower system was calculated and the results are shown in Table 2. These values correspond to a "plant volume" of 4268 units. Consequently the invention provides a plant volume reduction of 73 percent.

TABLE 2

| Quantity | Stream | Tower | | |
| --- | --- | --- | --- | --- |
| | | Hot | Cold | Reflux |
| Flow rate (moles/hr.) | Ammonia | 2,188 | 1,762 | 1,762 |
| | Process | 10,554 | 10,554 | 18,196 |
| Approach to Equilibrium. | Enriched end | 0.94 | 0.53 | 0.79 |
| | Depleted end | 0.85 | 0.79 | 0.54 |
| Theoretical stages | | 48.67 | 3.37 | 7.82 |

We claim:

1. In a process for the production of deuterium enriched materials comprising a dual-temperature ammonia-hydrogen exchange process wherein depleted and enriched streams of hydrogen and ammonia are circulated continuously between relatively hot and cold towers, the improvement wherein the depleted stream of ammonia from the hot tower is split into two sub-streams, the first of these sub-streams having its deuterium content replenished by being passed in counter-current flow with a hydrogen-containing gas in a cold transfer tower operated at substantially the same temperature as the cold tower, the second of these sub-streams being passed in counter-current flow with the stream of hydrogen from the cold tower in a cold reflux tower operated at substantially the same temperature as the cold tower, and said two sub-streams being combined and being passed to the cold tower.

2. The process of claim 1, wherein the nydrogen-containing gas is ammonia synthesis gas.

3. The process of claim 1, including effecting heat exchange between the ammonia entering and leaving the hot tower and between the hydrogen entering and leaving the hot tower.

4. The process of claim 3, wherein ammonia condensed from the hydrogen steam leaving the hot tower is passed to the ammonia stream prior to its entry into the hot tower.

5. The process of claim 1, including evaporating a proportion of the ammonia leaving the hot tower and adding it to the hydrogen entering the hot tower.

References Cited

UNITED STATES PATENTS 3,036,891   5/1962   Becker _____ 23—204

OSCAR R. VERTIZ, Primary Examiner

H. S. MILLER, Assistant Examiner

U.S. Cl. X.R.

23—204, 263, 289